US012661799B2

(12) United States Patent
Tian et al.

(10) Patent No.: US 12,661,799 B2
(45) Date of Patent: Jun. 23, 2026

(54) METHOD AND APPARATUS FOR ROBOT SYSTEM MANAGEMENT

(71) Applicant: ABB Schweiz AG, Baden (CH)

(72) Inventors: Ye Tian, Shanghai (CN); Xinyu Fang, Shanghai (CN); Jiafan Zhang, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 160 days.

(21) Appl. No.: 18/263,408

(22) PCT Filed: Apr. 13, 2021

(86) PCT No.: PCT/CN2021/087013
§ 371 (c)(1),
(2) Date: Jul. 28, 2023

(87) PCT Pub. No.: WO2022/217464
PCT Pub. Date: Oct. 20, 2022

(65) Prior Publication Data
US 2024/0083036 A1 Mar. 14, 2024

(51) Int. Cl.
*B25J 9/16* (2006.01)
*B25J 19/02* (2006.01)
(52) U.S. Cl.
CPC ........... *B25J 9/1697* (2013.01); *B25J 9/1692* (2013.01); *B25J 19/023* (2013.01)
(58) Field of Classification Search
USPC ................................................ 700/245–264
See application file for complete search history.

(56) References Cited

U.S. PATENT DOCUMENTS

| | | | | |
|---|---|---|---|---|
| 9,056,396 B1 * | 6/2015 | Linnell | .................. | B25J 9/1664 |
| 10,513,036 B2 * | 12/2019 | Kokubo | ................. | B25J 9/1697 |
| 11,912,513 B1 * | 2/2024 | Polido | ................... | B25J 9/1697 |
| 2005/0080512 A1 * | 4/2005 | Critchlow | ............. | B25J 9/1692 |
| 2005/0107920 A1 * | 5/2005 | Ban | ........................ | B25J 9/1692 |
| | | | | 700/245 |
| 2005/0222793 A1 * | 10/2005 | Lloyd | ................... | A61B 90/36 |
| | | | | 702/104 |
| 2006/0258938 A1 * | 11/2006 | Hoffman | ................. | A61B 5/06 |
| | | | | 600/424 |
| 2016/0059417 A1 * | 3/2016 | Shirakyan | ............. | B25J 9/1674 |
| | | | | 700/254 |
| 2016/0184995 A1 * | 6/2016 | Uchiyama | ............. | B25J 9/1692 |
| | | | | 700/259 |
| 2016/0184997 A1 * | 6/2016 | Uchiyama | ............. | B25J 9/1697 |
| | | | | 700/259 |

(Continued)

FOREIGN PATENT DOCUMENTS

EP 3747389 A1 12/2020

*Primary Examiner* — Jonathan L Sample
(74) *Attorney, Agent, or Firm* — Greenberg Traurig, LLP

(57) ABSTRACT

Methods, apparatuses, systems, and computer readable media for determining a position of a tracking device. The tracking device includes a vision sensor and an inertial sensor. A first position of the tracking device in relative to a reference marker is obtained based on an image of the reference marker that is collected by the vison sensor. A second position of the tracking device in relative to the first position is obtained by the inertial sensor after a movement of the tracking device. A position of the tracking device in relative to the reference marker is determined based on the first and second positions.

36 Claims, 7 Drawing Sheets

(56)                References Cited

U.S. PATENT DOCUMENTS

| | | | |
|---|---|---|---|
| 2017/0281297 A1* | 10/2017 | Tuma ..................... | A61B 90/39 |
| 2018/0126553 A1* | 5/2018 | Corkum ................. | B25J 9/1697 |
| 2018/0345493 A1* | 12/2018 | Kokubo ................ | B25J 9/1697 |
| 2019/0328462 A1* | 10/2019 | Liu ........................ | G16H 40/63 |
| 2019/0380794 A1* | 12/2019 | Al Jewad .............. | A61B 34/20 |
| 2020/0024853 A1* | 1/2020 | Furrer ..................... | B25J 9/163 |
| 2020/0078948 A1* | 3/2020 | Krause .................. | G06F 3/0346 |
| 2020/0164518 A1* | 5/2020 | Lager ..................... | B25J 9/1697 |
| 2020/0398433 A1* | 12/2020 | Kelly ..................... | B25J 13/085 |
| 2021/0129326 A1* | 5/2021 | Do ......................... | B25J 9/1661 |
| 2021/0129330 A1* | 5/2021 | Pipe-Mazo ............... | B25J 9/16 |
| 2021/0133496 A1* | 5/2021 | Barnehama ........... | G06T 7/0004 |
| 2021/0299876 A1* | 9/2021 | Vepakomma .......... | B25J 9/1692 |

\* cited by examiner

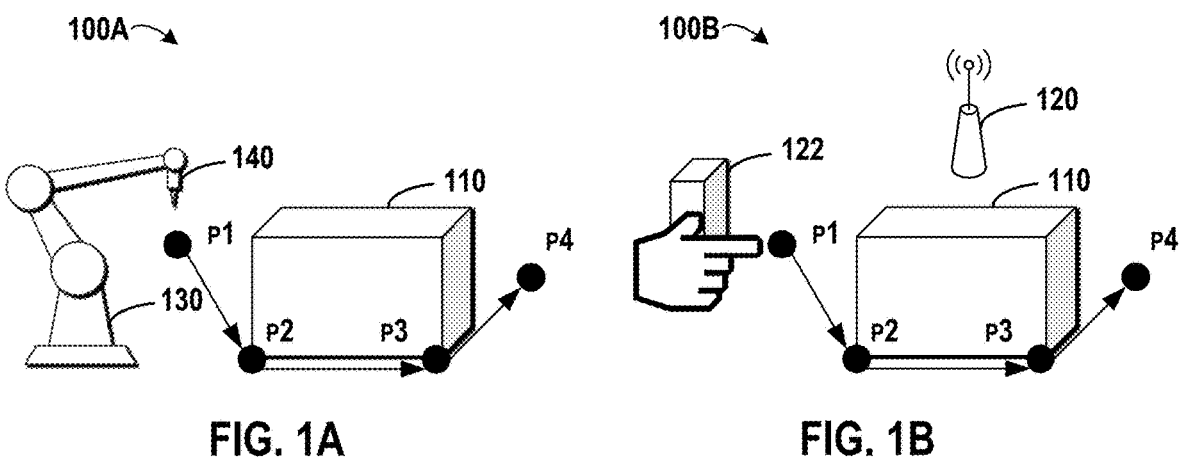
FIG. 1A
FIG. 1B
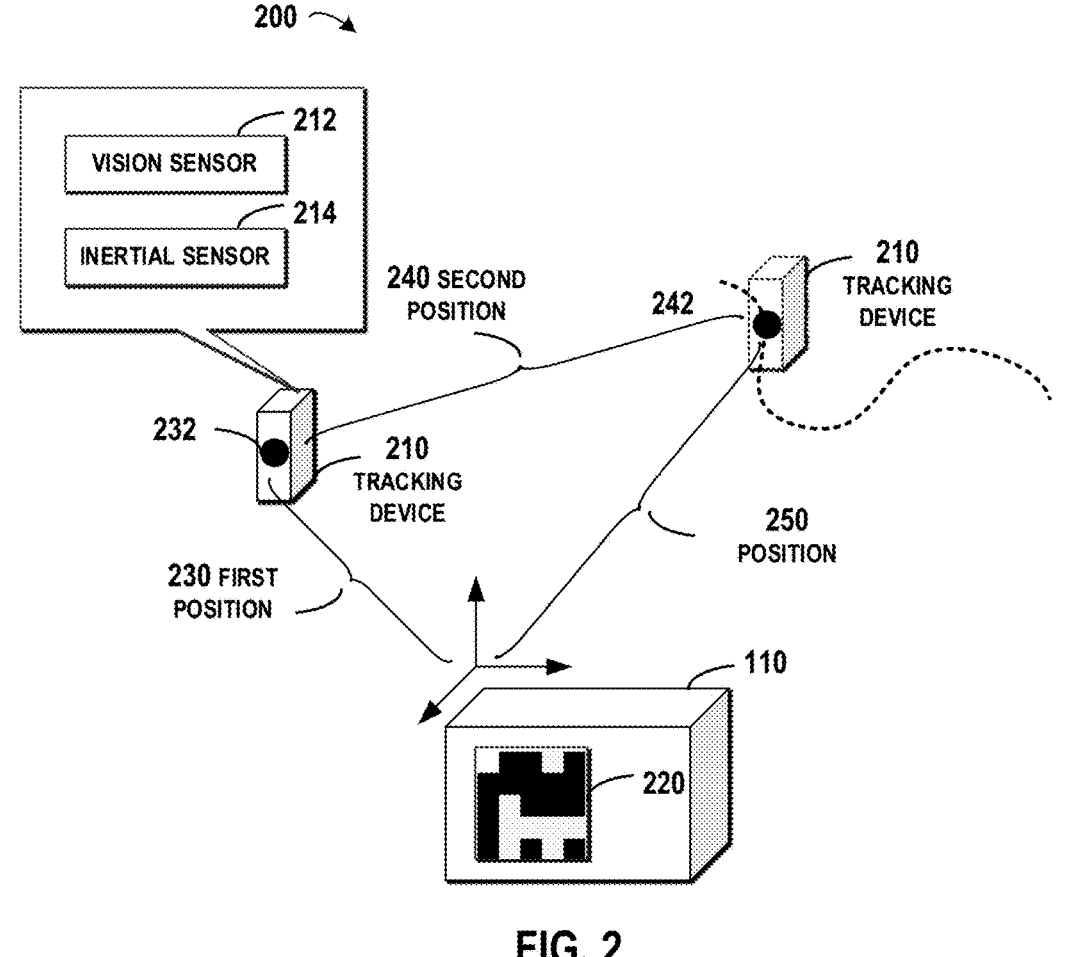
FIG. 2

500

600

700

720 TOOL PATH

210
TRACKING
DEVICE

140

710 TRAJECTORY

800

810

812

820

ROBOT PATH

830

ROBOT
CONTROLLER

140

130

110

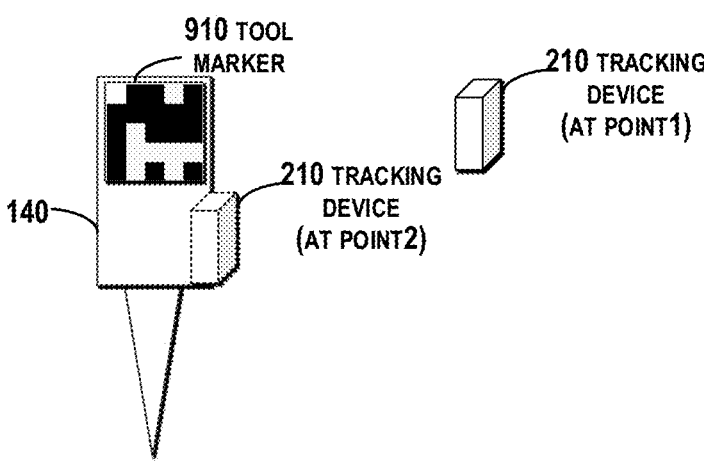

FIG. 9

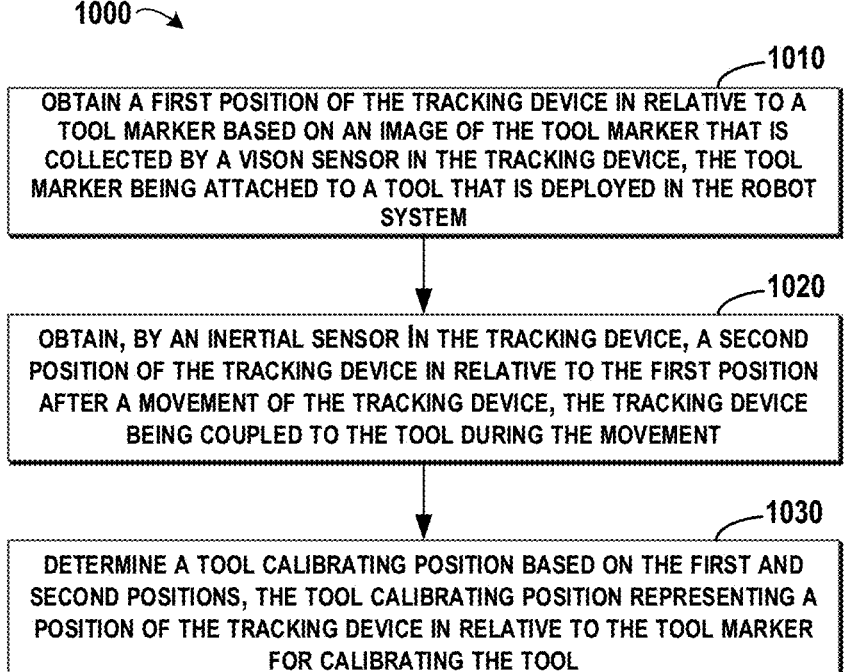

1000

1010

OBTAIN A FIRST POSITION OF THE TRACKING DEVICE IN RELATIVE TO A TOOL MARKER BASED ON AN IMAGE OF THE TOOL MARKER THAT IS COLLECTED BY A VISON SENSOR IN THE TRACKING DEVICE, THE TOOL MARKER BEING ATTACHED TO A TOOL THAT IS DEPLOYED IN THE ROBOT SYSTEM

1020

OBTAIN, BY AN INERTIAL SENSOR IN THE TRACKING DEVICE, A SECOND POSITION OF THE TRACKING DEVICE IN RELATIVE TO THE FIRST POSITION AFTER A MOVEMENT OF THE TRACKING DEVICE, THE TRACKING DEVICE BEING COUPLED TO THE TOOL DURING THE MOVEMENT

1030

DETERMINE A TOOL CALIBRATING POSITION BASED ON THE FIRST AND SECOND POSITIONS, THE TOOL CALIBRATING POSITION REPRESENTING A POSITION OF THE TRACKING DEVICE IN RELATIVE TO THE TOOL MARKER FOR CALIBRATING THE TOOL

1110 ROBOT MARKER

140

210 TRACKING DEVICE (AT POINT3)

130

110

1120 WORK OBJECT MARKER

210 TRACKING DEVICE (AT POINT4)

1200

140

210 TRACKING DEVICE

720 TOOL PATH

1210 ROBOT PATH

140

130

1300A
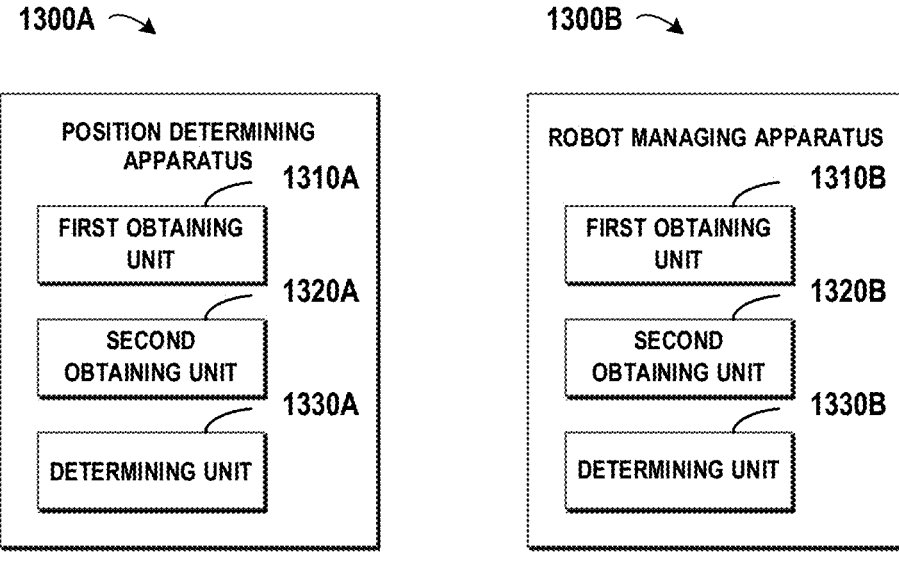
FIG. 13A
FIG. 13B
1400
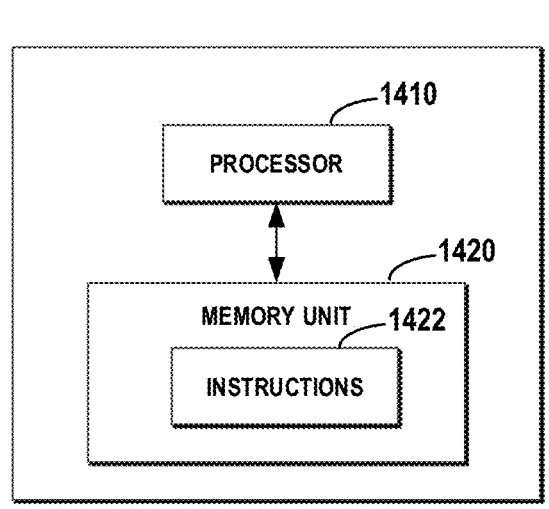
FIG. 14

METHOD AND APPARATUS FOR ROBOT SYSTEM MANAGEMENT

CROSS-REFERENCE TO RELATED APPLICATIONS

This is a national stage application claiming priority to International patent application Serial No.: PCT/CN2021/087013, filed on Apr. 13, 2021; which is herein incorporated by reference in its entirety.

FIELD

Example embodiments of the present disclosure generally relate to robot system management, and more specifically, to methods, apparatuses, systems and computer readable media for determining a position by a tracking device in a robot system.

BACKGROUND

With the development of computer and automatic control, robot systems have been widely used to process various types of work objects in the manufacturing industry. For example, a tool may be equipped at an end arm in a robot system for processing a work object, by operations such as cutting, grabbing and so on. Typically, the robot system may have a plurality of mechanical arms, each of which may be rotated by a corresponding joint at an end of the arm. The robot system may be programed to drive the tool along a path for processing the work object based on the Program By Demonstration (PBD) technique. However, the PBD technique involves complex procedures and has drawbacks in position determination. Therefore, it is desired to propose a more efficient solution for position determination, and thus the robot system may be managed based on the determined positions in an effective way.

SUMMARY

Example embodiments of the present disclosure provide solutions for robot system management.

In a first aspect, example embodiments of the present disclosure provide a method for determining a position of a tracking device, here the tracking device includes a vision sensor and an inertial sensor. The method comprises: obtaining a first position of the tracking device in relative to a reference marker based on an image of the reference marker that is collected by the vison sensor; obtaining by the inertial sensor a second position of the tracking device in relative to the first position after a movement of the tracking device; and determining a position of the tracking device in relative to the reference marker based on the first and second positions. With these embodiments, a tracking device that includes both of a vision sensor and an inertial sensor is provided for position determination. At this point, the tracking device may determine the position by itself without a requirement of outside sensors (such as a signal source for emitting signals such as a laser signal, a magnetic signal, a Wi-Fi signal, and so on). Further, errors caused by a barrier object that blocks the signal source or interference to the signal source may be eliminated. Therefore, the position determination may be implemented in a more convenient and effective way.

In some embodiments, obtaining the first position comprises: obtaining a real size of the reference marker; obtaining a virtual size of the reference marker in the image; and determining the first position based on the real size, the virtual size and a focus parameter of the vision sensor. As the real size of the reference marker and the focus parameter are known in advance, and the virtual size may be easily measured by pixels included in the image, the first position may be determined in an easy and effectively way.

In some embodiments, the method further comprises: collecting by the vision sensor an environment image of an working environment of the tracking device after the movement; and correcting the second position based on the environment image and a previous environment image that is collected by the vision sensor at a previous time point before a time point for collecting the environment image. With these embodiments, images that are collected during the movement of the tracking device may further correct a potential error of the inertial sensor. Therefore, the accuracy of the position determination may be further increased.

In some embodiments, correcting the second position comprises: identifying a pair of feature points from the environment image and the previous environment image based on an image analysis, respectively, the pair of feature points corresponding to an environment feature in the working environment; and determining an offset between positions of the pair of feature points; and correcting the second position based on the offset. With these embodiments, natural factors in the work environment such as a point, a line and so on may be used as the environment feature for correcting an error caused by the inertial sensor. As the environment includes rich natural factors, the accuracy of the position determination may be further increased effectively.

In some embodiments, the tracking device is attached to one of a tool that is deployed in a robot system and a work object that is to be processed by the robot system, and the reference marker is attached to the other of the tool and the work object. With these embodiments, the relative position between the tool and the work object that is to be processed by the tool may be determined in an accurate way.

In some embodiments, the method further comprises: determining a group of positions of the tracking device during a movement of the tool along a trajectory for processing the work object. With these embodiments, the tracking device may be used for obtaining a path for processing the work object, and thus an engineer may lead the tracking device along the trajectory. Compared with a regular way for generating the path with the tracking tool and the signal source, the tracking device itself may record a tool path effectively and accurately. Further, the tool path may be converted into a robot path for driving the robot system to process the work object.

In some embodiments, the tracking device includes a phone device, the vision sensor includes a camera equipped in the phone device, and the inertial sensor includes an Inertial Measurement Unit (IMU) equipped in the phone device. Here, the phone device may be reused as the tracking device and thus it is not required to design a dedicated tracking device. With these embodiments, a common phone device such as a smart phone may act as the tracking device. Specifically, the camera device in the smart phone may work as the vision sensor for collecting images, and the IMU in the smart phone may work as the inertial sensor for determining a position of the smart phone.

In some embodiments, the method is implemented by an application that is installed in the phone device, and the method further comprises: adjusting a processing parameter of the robot system via a user input to the application. With these embodiments, it is not required to make any change to the hardware of the phone device, instead it only requires an application to be installed in the phone device, and then the application may implement the above steps for the position determination. Further, an engineer for controlling the robot system may adjust parameters of the robot system with the application. Compared with a regular way for controlling the robot system by writing and running software codes, the application may provide a convenience way for the robot system management.

In some embodiments, the reference marker includes a Quick Response (QR) code. With these embodiments, the QR code may be used as the reference marker. Compared with a regular measuring tool with a large size and a high precision, the QR code is easy to be generated with a smaller size and a high precision. Therefore, the QR code may facilitate the position determination in an easy and effective way.

In a second aspect, example embodiments of the present disclosure provide a method for managing a robot system by a tracking device, here the tracking device includes a vision sensor and an inertial sensor. The method comprises: obtaining a first position of the tracking device in relative to a tool marker based on an image of the tool marker that is collected by the vison sensor, the tool marker being attached to a tool that is deployed in the robot system; obtaining by the inertial sensor a second position of the tracking device in relative to the first position after a movement of the tracking device, the tracking device being coupled to the tool during the movement; determining a tool calibrating position based on the first and second positions, the tool calibrating position representing a position of the tracking device in relative to the tool marker for calibrating the tool. Compared with a regular method for calibrating the tool by placing the tool deployed in the robot system in multiple poses in a complex calibrating procedure, the proposed solution only needs to attach the tool marker to the tool and collect measurements by the tracking device. Then, the tool calibrating position may be automatically determined from the measurements from the vision sensor and the inertial sensor. Accordingly, the workload for calibrating the tool may be greatly reduced.

In some embodiments, determining the tool calibrating position comprises: obtaining a position of the tool marker in relative to a tool base of the robot system; and determining the tool calibrating position based on the position of the tool marker and the first and second positions. With these embodiments, the position of the tool marker is easily to be measured in an accurate way and thus the tool calibrating position may be determined accurately.

In some embodiments, the method further comprises: obtaining an object calibrating position based on a robot marker and a work object marker, the robot marker being attached to the tool, the work object marker being attached to a work object that is to be processed by the robot system, and the object calibrating position representing a position of the work object marker in relative to a frame base of the robot system for calibrating the work object. Compared with a regular method for calibrating the work object by placing arms of the robot system in multiple poses around the work object with a calibrating tool, the proposed solution only needs to attach the robot marker to the tool and attach the work object marker to the work object. Then, the object calibrating position may be automatically determined. Accordingly, the complexity level for calibrating the work object may be greatly reduced.

In some embodiments, obtaining the object calibrating position comprises: obtaining a third position of the tracking device in relative to the robot marker based on an image of the robot marker that is collected by the vison sensor; obtaining a fourth position of the tracking device in relative to the work object marker based on an image of the work object marker that is collected by the vison sensor after a movement of the tracking device, the tracking device being moved for collecting the image of the work object marker; obtaining by the inertial sensor a fifth position of the tracking device in relative to the third position during the movement; and determining the object calibrating position based on a position of the robot marker, and the third, fourth, and fifth positions. With these embodiments, the vision sensor may collect the images of the robot marker and the work object marker. Further, the object calibrating position may be determined automatically based on the images and a measurement of the inertial sensor.

In some embodiments, the method further comprises: obtaining a plurality of positions of the tracking device in relative to the work object markers, the tracking device being coupled to the tool, and the plurality of positions being determined during a movement of the tool along a trajectory for processing the work object by the robot system; and generating a tool path based on the plurality of positions of the tracking device. With these embodiments, the tracking device may be attached to a tool for processing a work object, and thus an engineer may lead the tool along the trajectory. Compared with a regular way for generating the tool path by the tracking tool and the signal source, the tracking device itself may record a tool path in a more effective and accurate way. Further, the tool path may be converted into a robot path for driving the robot system to process the work object.

In some embodiments, obtaining the plurality of positions comprises: obtaining a sixth position of the tracking device in relative to the work object marker based on an image of the work object marker that is collected by the vison sensor; obtaining by the inertial sensor a seventh position of the tracking device in relative to the sixth position during the movement of the tool; and determining a position in the plurality of the tracking device in relative to the work object marker based on the sixth and seventh positions. With these embodiments, a tracking device that includes both of the vision sensor and the inertial sensor is provided for determining each position in the path. At this point, the tracking device may determine the position by itself without a requirement of outside signal sources. Further, errors in determined positions caused by a block of the signal source or interference to the signal source may be eliminated. Therefore, the position determination may be implemented in a more convenient and effective way.

In some embodiments, the method further comprises: generating a robot path for processing the work object based on the tool calibrating position, the object calibrating position, and the tool path. With these embodiments, the obtained tool path may be automatically converted into the robot path for controlling a movement of the tool in the robot system.

In some embodiments, the method further comprises: controlling the robot system to process the work object based on the robot path. With these embodiments, the robot system may drive the tool to exactly follow the trajectory and thus the work object may be accurately processed into a desired shape.

In some embodiments, any of the tool marker, the work object marker, and the robot marker includes a Quick Response (QR) code. With these embodiments, the QR code may be used as any of these markers. Compared with a regular calibrating tool with a large size and a high precision, the QR code is easy to be generated with a smaller size and a high precision. Therefore, the QR code may facilitate the calibration in an easy and effective way.

In a third aspect, example embodiments of the present disclosure provide an apparatus for determining a position of a tracking device, the tracking device includes a vision sensor and an inertial sensor. The apparatus comprises: a first obtaining unit for obtaining a first position of the tracking device in relative to a reference marker based on an image of the reference marker that is collected by the vison sensor; a second obtaining unit for obtaining by the inertial sensor a second position of the tracking device in relative to the first position after a movement of the tracking device; and a determining unit for determining a position of the tracking device in relative to the reference marker based on the first and second positions.

In some embodiments, the first obtaining unit comprises: a real size obtaining unit for obtaining a real size of the reference marker; a virtual size obtaining unit for obtaining a virtual size of the reference marker in the image; and a position determining unit for determining the first position based on the real size, the virtual size and a focus parameter of the vision sensor.

In some embodiments, the apparatus further comprises: a collecting unit for collecting by the vision sensor an environment image of an working environment of the tracking device after the movement; and a correcting unit for correcting the second position based on the environment image and a previous environment image that is collected by the vision sensor at a previous time point before a time point for collecting the environment image.

In some embodiments, the correcting unit comprises: an identifying unit for identifying a pair of feature points from the environment image and the previous environment image based on an image analysis, respectively, the pair of feature points corresponding to an environment feature in the working environment; and an offset determining unit for determining an offset between positions of the pair of feature points; and a position correcting unit for correcting the second position based on the offset.

In some embodiments, the tracking device is attached to one of a tool that is deployed in a robot system and a work object that is to be processed by the robot system, and the reference marker is attached to the other of the tool and the work object.

In some embodiments, the apparatus further comprises: a path determining unit for determining a group of positions of the tracking device during a movement of the tool along a trajectory for processing the work object.

In some embodiments, the tracking device includes a phone device, the vision sensor includes a camera equipped in the phone device, and the inertial sensor includes an inertial measurement unit equipped in the phone device.

In some embodiments, the apparatus is implemented by an application that is installed in the phone device, and the apparatus further comprises: an adjusting unit for adjusting a processing parameter of the robot system via a user input to the application.

In some embodiments, the reference marker includes a Quick Response (QR) code.

In a fourth aspect, example embodiments of the present disclosure provide an apparatus for managing a robot system in accordance with embodiments of the present disclosure, here the tracking device includes a vision sensor and an inertial sensor. The apparatus comprises: a first obtaining unit for obtaining a first position of the tracking device in relative to a tool marker based on an image of the tool marker that is collected by the vison sensor, the tool marker being attached to a tool that is deployed in the robot system; a second obtaining unit for obtaining by the inertial sensor a second position of the tracking device in relative to the first position after a movement of the tracking device, the tracking device being coupled to the tool during the movement; and a determining unit for determining a tool calibrating position based on the first and second positions, the tool calibrating position representing a position of the tracking device in relative to the tool marker for calibrating the tool.

In some embodiments, the determining unit comprises: a tool position obtaining unit for obtaining a position of the tool marker in relative to a tool base of the robot system; and a tool calibration determining unit for determining the tool calibrating position based on the position of the tool marker and the first and second positions.

In some embodiments, the apparatus further comprises: an object obtaining unit for obtaining an object calibrating position based on a robot marker and a work object marker, the robot marker being attached to the tool, the work object marker being attached to a work object that is to be processed by the robot system, and the object calibrating position representing a position of the work object marker in relative to a frame base of the robot system for calibrating the work object.

In some embodiments, the object obtaining unit comprises: a third obtaining unit for obtaining a third position of the tracking device in relative to the robot marker based on an image of the robot marker that is collected by the vison sensor; a fourth obtaining unit for obtaining a fourth position of the tracking device in relative to the work object marker based on an image of the work object marker that is collected by the vison sensor after a movement of the tracking device, the tracking device being moved for collecting the image of the work object marker; a fifth obtaining unit for obtaining by the inertial sensor a fifth position of the tracking device in relative to the third position during the movement; and an object calibration determining unit for determining the object calibrating position based on a position of the robot marker, and the third, fourth, and fifth positions.

In some embodiments, the apparatus further comprises: a position obtaining unit for obtaining a plurality of positions of the tracking device in relative to the work object marker, the tracking device being coupled to the tool, and the plurality of positions being determined during a movement of the tool along a trajectory for processing the work object by the robot system; and a generating unit for generating a tool path based on the plurality of positions of the tracking device.

In some embodiments, the position obtaining unit comprises: a sixth obtaining unit for obtaining a sixth position of the tracking device in relative to the work object marker based on an image of the work object marker that is collected by the vison sensor; a seventh obtaining unit for obtaining by the inertial sensor a seventh position of the tracking device in relative to the sixth position during the movement of the tool; and a path position determining unit for determining a position in the plurality of positions of the tracking device in relative to the work object marker based on the sixth and seventh positions.

In some embodiments, the apparatus further comprises: a generating unit for generating a robot path for processing the work object based on the tool calibrating position, the object calibrating position, and the tool path.

In some embodiments, the apparatus further comprises: a controlling unit for controlling the robot system to process the work object based on the robot path.

In some embodiments, any of the tool marker, the work object marker, and the robot marker includes a Quick Response (QR) code.

In a fifth aspect, example embodiments of the present disclosure provide a system for determining a position of a tracking device. The system comprises: a computer processor coupled to a computer-readable memory unit, the memory unit comprising instructions that when executed by the computer processor implements the method for determining a position of a tracking device.

In a sixth aspect, example embodiments of the present disclosure provide a computer readable medium having instructions stored thereon, the instructions, when executed on at least one processor, cause the at least one processor to perform the method for determining a position of a tracking device.

In a seventh aspect, example embodiments of the present disclosure provide a system for managing a robot system. The system comprises: a computer processor coupled to a computer-readable memory unit, the memory unit comprising instructions that when executed by the computer processor implements the method for managing a robot system.

In an eighth aspect, example embodiments of the present disclosure provide a computer readable medium having instructions stored thereon, the instructions, when executed on at least one processor, cause the at least one processor to perform the method for managing a robot system.

DESCRIPTION OF DRAWINGS

FIG. 1 illustrates a schematic diagram for determining a position along a trajectory for processing a work object by a robot system;

FIG. 1B illustrates a schematic diagram for determining a position along a trajectory for processing a work object by a robot system;

FIG. 2 illustrates a schematic diagram of a procedure for determining a position of a tracking device in accordance with embodiments of the present disclosure;

FIG. 9 illustrates a schematic flowchart of a method for managing a robot system by a tracking device in accordance with embodiments of the present disclosure;

FIG. 10 illustrates a schematic diagram of a procedure for calibrating a tool deployed in a robot system in accordance with embodiments of the present disclosure;

FIG. 13A illustrates a schematic diagram of an apparatus for determining a position of a tracking device in accordance with embodiments of the present disclosure;

FIG. 13B illustrates a schematic diagram of an apparatus for managing a robot system in accordance with embodiments of the present disclosure;

FIG. 14 illustrates a schematic diagram of a system for implementing a method in accordance with embodiments of the present disclosure.

Throughout the drawings, the same or similar reference symbols are used to indicate the same or similar elements.

DETAILED DESCRIPTION OF EMBODIMENTS

Figure 3:
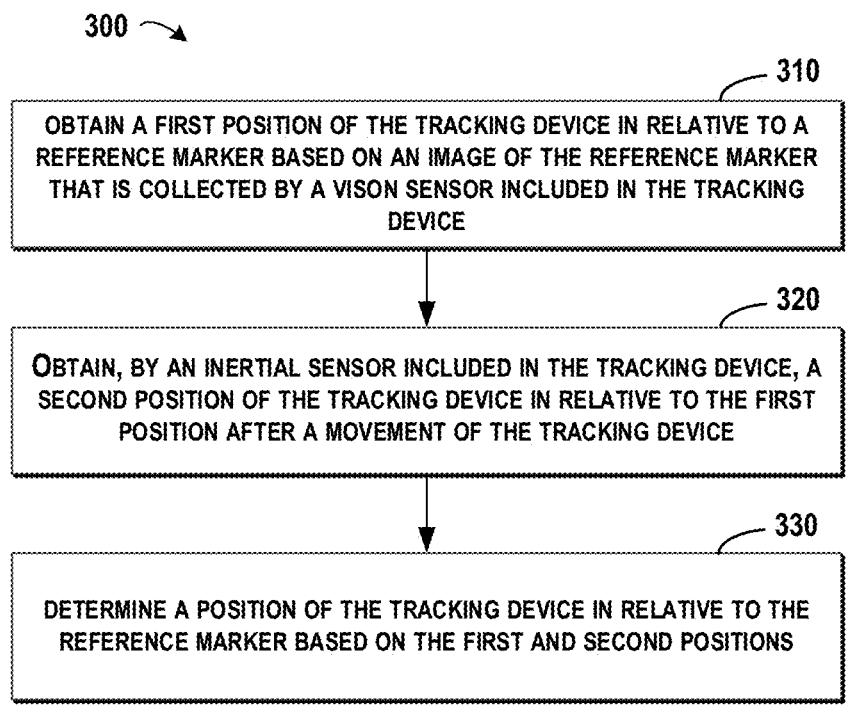
FIG. 3 illustrates a schematic flowchart of a method for determining a position of a tracking device in accordance with embodiments of the present disclosure.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

In the robot industry, robot programming refers to generating a robot path that leads a tool deployed at the end arm of the robot system to process the work object. The PBD technique is one of the popular solutions for generating the robot path. The PBD technique includes two modes: a lead-through mode and a non-touch mode. Reference will be made to FIG. 1A for describing the lead-through mode. In FIG. 1A, a tool 140 is attached to an end arm of a robot system 130 for processing a work object 110. The tool 140 together with the robot arms are directly moved by the engineer so as to lead the tool 140 along a desired trajectory (including, for example, P1, P2, P3, P4, . . . ). At this point, poses of arms are recorded and then the robot path may be generated to repeat the recorded poses. However, normal operations of the robot system 130 should be interrupted by the above steps, meanwhile, the engineer has to enter into robot working area for moving the arms. For an industrial robot system, the lead-through mode decreases the production efficiency and also has serious safety concerns.

In the non-touch mode, the engineer holds a special tracking tool instead of the robot arm without a need to enter into the robot working area. Usually, the tracking tool may be moved by the engineer along a desired trajectory, and sensors around the tracking tool may be used to track and record poses of the tracking tool. Reference will be made to FIG. 1B for describing the non-touch mode. In FIG. 1B, the engineer may hold a tracking tool 122 and move along a trajectory for processing the work object 110. One or more sensor 120 (such as a laser sensor, a magnetic sensor, a Wi-Fi sensor, a vison sensor, and so on) may be deployed in advance, and the sensor 120 should be carefully calibrated before tracking positions P1, P2, P3, P4, and so on for the tracking tool 122. However, sensors cannot work when the tracking tool 122 is far away or a barrier object blocks communications between the sensor 120 and the tracking tool 122. Moreover, if a magnetic sensor is used for tracking, the magnetic sensor has limited working range and can be impacted by ferromagnetic materials.

In order to at least partially solve the above and other potential problems, a new method is provided for position determination according to embodiments of the present disclosure. In general, a handhold tracking device that includes both of a vison sensor and an inertial sensor is provided for tracking. As all the sensors are embedded in the tracking device, no accessory equipment is required around the tracking device. Therefore, the tracking device may work in a large area. Further, the tracking device will not be influenced by ferromagnetic interference and/or barriers in the working environment.

Reference will be made to FIG. 2 for a brief description of the present disclosure. FIG. 2 illustrates a schematic diagram of a procedure 200 for determining a position of a tracking device in accordance with embodiments of the present disclosure. In FIG. 2, a tracking device 210 includes a vision sensor 212 and an inertial sensor 214. Further, a reference marker 220 is provided for facilitating the position determination. Here, the reference marker 220 may define a coordinate for the position determination, that is, the determined position is in relative to the reference marker 220. For example, if it is desired to determine a position of the tracking device 210 in relative to the work object 110 that is to be processed by the robot system 130, the reference marker 220 may be attached to the work object 110.

The engineer may hold the tracking device 210 to a point 232 and scan the reference marker 220. At this point, a first position 230 of the tracking device 210 in relative to the reference marker 220 may be determined from an image of the reference marker 220 collected by the vision sensor 212. Further, the tracking device 210 may be moved to a point 242, and the inertial sensor 214 may measure a second position 240 of the tracking device 210 in relative to the first position 230. Further, a position 250 of the tracking device 210 in relative to the reference marker 220 may be determined. With these embodiments, the tracking device 210 may determine the position by itself without a requirement of outside sensors (such as a signal source for emitting signals such as a laser signal, a magnetic signal, a Wi-Fi signal, and so on). Further, errors caused by a barrier object between the regular tracking tool and the sensor or interference to the signal source may be eliminated.

Hereinafter, reference will be made to FIG. 3 for more details about the position determination. FIG. 3 illustrates a schematic flowchart of a method for determining a position of a tracking device in accordance with embodiments of the present disclosure. At a block 310, a first position 230 of the tracking device 210 in relative to a reference marker 220 is obtained based on an image of the reference marker 220 that is collected by the vi son sensor 212. Here, the reference marker 220 is for defining a reference coordinate for the position determination. In the situation of determining a robot path for processing the work object 110, the reference marker 220 may be attached to the work object 110.

In some embodiments, the reference marker 220 may be attached to any position on the work object 110, for example, the reference marker 220 may be attached to a corner that will not affect the processing procedure. In some embodiments, an origin point of the reference coordinate may be defined at a corner of the reference marker 220, at a center of the reference marker 220, or at another position related to the reference marker 220. In some embodiments, axis directions of the reference coordinate in relative to the reference marker 220 may be defined in advance. For example, the x axis and the y axis may be defined along edges of the reference marker 220, and a right hand coordinate may be used.

In some embodiments, the reference marker 220 may include a Quick Response (QR) code. With these embodiments, the QR code may be used as the reference marker 220. Compared with the regular measuring tools with a large size and a high precision, the QR code is easy to be generated with a smaller size and a high precision. Therefore, the QR code may facilitate the position determination in an easy and effective way. Further, offsets between the reference marker 220 and the reference coordinate may be encoded in the QR code. Once the vision sensor 212 scans the QR code, the offsets may be read out and then the reference coordinate may be generated in an easy and effective way.

Figure 4:
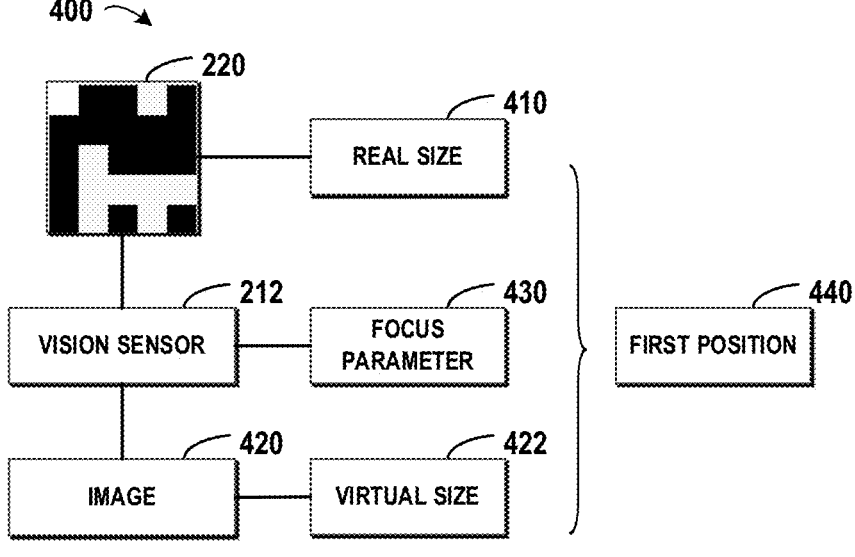
FIG. 4 illustrates a schematic diagram of a procedure for determining a position of a tracking device at an initial phase in accordance with embodiments of the present disclosure.

Hereinafter, reference will be made to FIG. 4 for more details about determining the first position 230. FIG. 4 illustrates a schematic diagram of a procedure 400 for determining a position of a tracking device at an initial phase in accordance with embodiments of the present disclosure. First, a real size 410 of the reference marker 220 may be obtained. Here, the real size 410 may be measured by a measuring equipment with a higher precision, for example, the real size 410 may be represented by a unit of millimeter, micrometer, and so on. The vision sensor 212 may collect an image 420 of the reference marker 220 when scanning the reference marker 220. A virtual size 422 of the reference marker 220 in the image 420 may be determined. For example, an outline of the reference marker 220 may be identified from the image 420, and a width and a length of the pixels within the outliner may be considered as the virtual size 422. Further, focus parameter(s) 430 of the vision sensor 212 may be obtained, and thus the first position 440 may be determined based on a geometry relationship between the real size 410, the virtual size 422 and a focus parameter 430 of the vision sensor 212. As the real size of the reference marker and the focus parameter are known in advance and the virtual size may be easily measured by pixels included in the image, the first position may be determined in an easy and effectively way.

At a block 320, a second position 240 of the tracking device 210 in relative to the first position 230 is obtained by the inertial sensor 214 after a movement of the tracking device 210. Here, the inertial sensor 214 may measures the specific force, the angular rate, the orientation of the tracking device 210 by using a combination of accelerometers, gyroscopes, and magnetometers and the so on. The inertial navigation technology has been developed for years and thus the second position 240 may be determined accurately. Further, images collected by the vision sensor 212 during the movement may be used for correcting a potential error caused by the inertial sensor 214.

In some embodiments, the vision sensor 212 may collect images of the working environment of the tracking device 210 during the movement. Here the image collecting rate may be much lower than the rate of the inertial sensor 214. If the vision sensor 212 is not blocked by a barrier, then the collected images may be used for correcting the second position 240. Specifically, the second position 2400 may be based on the environment image and a previous environment image that is collected by the vision sensor 212 at a previous time point before a time point for collecting the environment image. With these embodiments, images that are collected during the movement of the tracking device 210 may further correct a potential error of the inertial sensor 214. Therefore, the accuracy of the position determination may be further increased.

Figure 5:
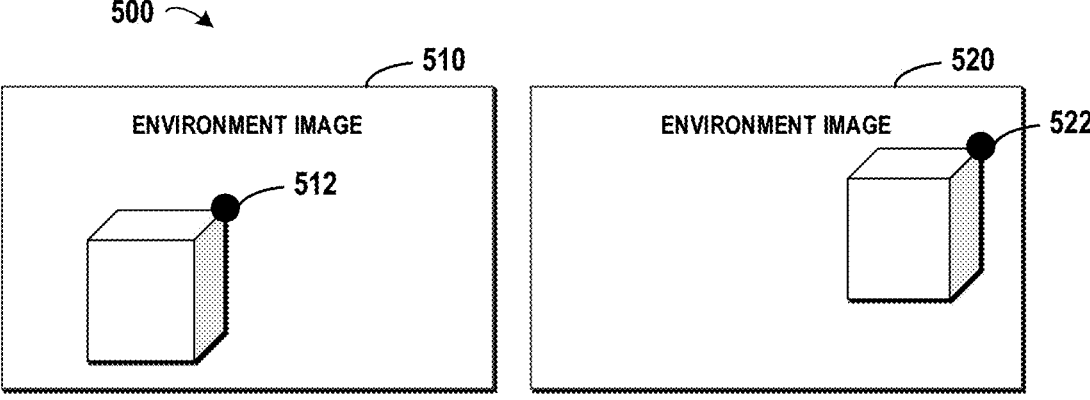
FIG. 5 illustrates a schematic diagram of a procedure for correcting a position obtained by an inertial sensor in accordance with embodiments of the present disclosure.

Reference will be made to FIG. 5 for more details. FIG. 5 illustrates a schematic diagram of a procedure 500 for correcting a position obtained by an inertial sensor in accordance with embodiments of the present disclosure. In the correcting step, it does not require that the images include the reference markers 220. Instead, the images may or may not include the reference markers 220, as along as the images include a same environment feature in the working environment. FIG. 5 shows an environment image 510 that is collected when the tracking device 210 is at the point 242, and a previous environment image 520 that is collected before the tracking device 210 reaches the point 242. Both images 510 and 520 include the same environment feature (for example, a corner, a line, or another shape of an object in the working environment). Based on an image analysis, a pair of feature points 512 and 522 may be identified from the environment image 510 and the previous environment image 520, respectively, here the pair of feature points correspond to the same environment feature in the working environment.

Further, an offset may be determined between positions of the pair of feature points 512 and 522, and then the second position 240 may be corrected based on the offset. If the offset shows that the tracking device 210 moves 20 millimeters while the second position 240 measured by the inertial sensor 214 is only 10 millimeters, the second position 240 may be increased. For example, the second position 240 may be set according to 15 millimeters based on an average of 20 millimeters and 10 millimeters. In another example, if the distance determined from the offset is greatly lower than what is determined by the inertial sensor 214, the second position 240 may be decreased. With these embodiments, natural factors in the environment such as a point, a line and so on may be used as the environment feature for correcting an error caused by the inertial sensor 214. As the environment includes rich natural factors, the accuracy of the position determination may be further increased in an easy and effective way.

Referring back to FIG. 3, at a block 330, a position 250 of the tracking device 210 in relative to the reference marker 220 is determined based on the first and second positions 230 and 240. Here, the position 250 may be determined according to a summation of the first position 230 and the second position 240, therefore the position 250 of the tracking device 210 in relative to the reference marker 220 may be obtained accurately by the tracking device 210 itself. With these embodiments, a tracking device that includes both of a vision sensor and an inertial sensor is provided for position determination. At this point, the tracking device may determine the position by itself without a requirement of outside sensors (such as a signal source for emitting signals such as a laser signal, a magnetic signal, a Wi-Fi signal, and so on). Further, errors in determined positions caused by a barrier object between the tracking device and the sensor or interference to the signal source may be eliminated.

The proceeding paragraphs have described steps for determining the position 250 of the tracking device 210 in relative to the reference marker 220. Further, the tracking device 210 may be used for measure a relative position between the tool 140 and the work object 110. Specifically, the tracking device 210 may be attached to one of the tool 140 that is deployed in the robot system 130 and the work object 110 that is to be processed by the robot system 130. Meanwhile, the reference marker 220 may be attached to the other of the tool 140 and the work object 110. With these embodiments, the relative position between the tool 140 and the work object 110 may be determined effectively.

Figure 6:
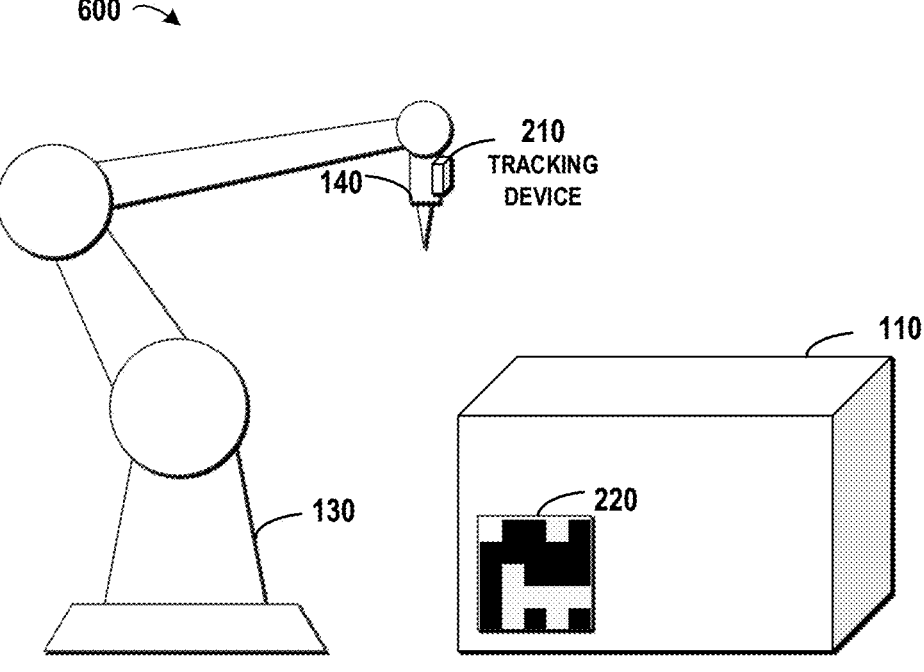
FIG. 6 illustrates a schematic diagram of a procedure for determining a relative position between a tool and a work object in accordance with embodiments of the present disclosure.

Hereinafter, reference will be made to FIG. 6 for more details for obtaining the relative position based on the above tracking device 210. FIG. 6 illustrates a schematic diagram of a procedure 600 for determining a relative position between a tool and a work object in accordance with embodiments of the present disclosure. In FIG. 6, the reference marker 220 may be attached to the work object 110, and the tracking device 210 may be attached to the tool 140. Therefore, the tracking device 210 may determine the relative position between the tracking device 210 and the reference mark 220 accurately. Although FIG. 6 only shows the situation where the tracking device 210 is attached to the tool 140 and the reference markers 220 is attached to the work object 110, the tracking device 210 may be attached to the work object 110 and the reference markers 220 may be attached to the tool 140. The relative position may be determined in a similar manner and details are omitted hereinafter.

Figure 7:
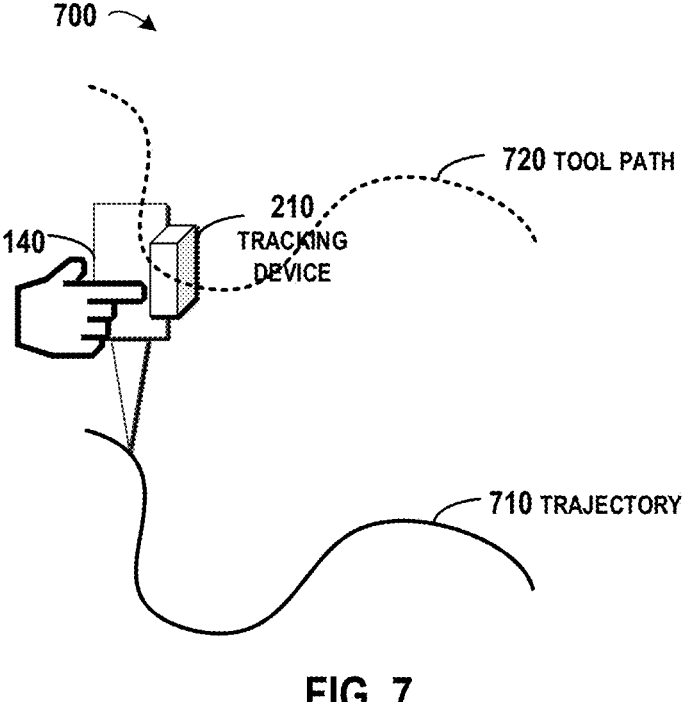
FIG. 7 illustrates a schematic diagram of a procedure for determining a tool path for processing a work object in accordance with embodiments of the present disclosure.

Further, the engineer may move the tool 140 along a trajectory for processing the work object 110, and thus the tracking device 210 may determine a group of positions of the tracking device 210 in relative to the reference 220 during the movement. FIG. 7 illustrates a schematic diagram of a procedure 700 for determining a tool path for processing a work object in accordance with embodiments of the present disclosure. In FIG. 7, a trajectory 710 represents a trajectory for processing the work object 110, for example, the trajectory 710 may be represented by a curve on the work object 110 for processing the work object 110 into desired shape). At this point, the engineer may hold the tool 140 and lead a tip of the tool 140 to follow the trajectory 710, and thus the tracking device 210 may output a tool path 720 based on the above method.

With these embodiments, the tracking device may be attached to a tool for processing a work object, and thus an engineer may lead the tool along the processing trajectory. Compared with a regular way for generating the tool path according to the lead-through mode and the non-touch mode, the tracking device itself may record a tool path accurately.

By now, various types of smart phone are equipped with high precision cameras and IMUs. Therefore, the tracking device 210 may be implemented by a phone device, the vision sensor 212 may be implemented by a camera equipped in the phone device, and the inertial sensor 214 may be implemented by an IMU equipped in the phone device. Here, it is not required to design a dedicated tracking device. With these embodiments, a common phone device such as a smart phone may be used as the tracking device. Specifically, the camera device in the smart phone may work as the vision sensor for collecting images, and the IMU in the smart phone may work as the inertial sensor for determining a position of the smart phone. Therefore, the cost for the tracking device may be greatly reduced.

Figure 8:
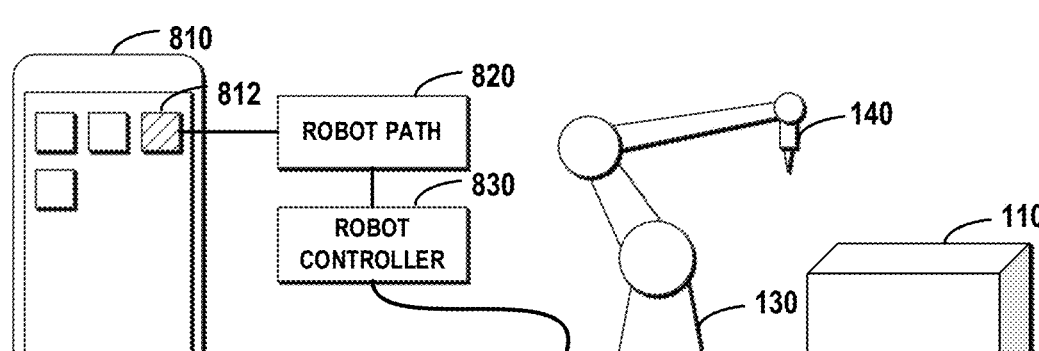
FIG. 8 illustrates a schematic diagram of a procedure for controlling a robot system by a smart phone to process a work object in accordance with embodiments of the present disclosure.

In some embodiments, an application may be developed and installed in the phone device for implementing the method 300. FIG. 8 illustrates a schematic diagram of a procedure 800 for controlling a robot system by a smart phone to process a work object in accordance with embodiments of the present disclosure. In FIG. 8, an application 812 is installed in a smart phone 810 for implementing the above method 300. The engineer may attach the reference marker 220 to the work object 110 and attach the smart phone 810 to the tool 140 for generating the tool path 720. Further, the application 812 may convert the tool path 720 into a robot path 820 for controlling the robot system 130. Specifically, the robot path 820 may be inputted into a robot controller 830 for driving the tool 140 to process the work object 110 into the desired shape.

In some embodiments, the application 812 may display the robot path 820 to the engineer for further control. For example, the robot path 820 may be illustrated as below in Table 1.

TABLE 1

| | | | Robot Path | | |
|---|---|---|---|---|---|
| No. | XYZ | Angle | Parameter1 | Parameter2 | . . . |
| 1 | | | | | |
| 2 | | | | | |
| . . . | | | | | |

In Table 1, the XYZ column represents the (x, y, z) position at a specific time point, the Angle column represents the orientation angles (angle1, angle2, angle3) at the specific time point, and the Parameter columns represent controlling parameters for the robot system 130. For example, Parameter1 may represent a rotation speed of the tool 140, Parameter2 may represent whether the tool 140 touches the work object 110, and so on. The engineer may read the robot path 820 from the smart phone 810 and may adjust the processing parameter of the robot system via a user input to the application 812. For example, the engineer may run the robot path 820 in a simulation program and check whether poses of each arm in the robot system may be optimized. Then, the engineer may optimize the parameters via the application 812 and input the optimized robot path into the robot controller 830.

With these embodiments, it is not required to make any change to the hardware of the phone device, instead it only requires an application to be installed in the phone device, and then the application may implement the above steps for the position determination. Further, an engineer for controlling the robot system may adjust parameters of the robot system with the application. Compared with a regular way for controlling the robot system 130 by writing and running software codes, the application may provide a convenience way for the robot system management. Although FIG. 8 shows that the application 812 outputs the robot path 820, alternatively and/or in addition to, the tool path may be inputted into the robot controller 830 and the robot controller 830 may generate the robot path 820.

At an initial phase for starting the robot system 130, positions of the tool 140 and the work object 110 should be calibrated. Various calibration solutions have been proposed, for example, the tool calibration is to align the user defined tool position in relative to a tool base of the robot system (the tool base is also called as "tool0" and it is a known parameter of the robot system). In the regular tool calibration, the tool 140 is moved to at least four different positions for collecting values for the tool calibration. However, if the tool does not have a tip structure, it is very difficult to implement the tool calibration with high accuracy. Even if the tool has a tip structure, it requires rich experience and skills for the engineer to place the tool to the desired positions.

In order to at least partially solve the above and other potential problems, a new method is provided for managing the robot system. Especially, the tool may be calibrated by using the tracking device 210 according to embodiments of the present disclosure. Reference will be made to FIG. 9 for more details, which figure illustrates a schematic diagram of a procedure 900 for calibrating a tool deployed in a robot system in accordance with embodiments of the present disclosure. In FIG. 9, a tool marker 910 may be attached to the tool 140 for indicating a coordinate for the tool calibration. First, the engineer may hold the tracking device 210 at a point (illustrated as point 1 in FIG. 9) for scanning the tool marker 910. At this point, a first position of the tracking device in relative to the tool marker 910 may be obtained. Further, the tracking device 210 may be attached to the tool 140 at another point (illustrated as point 2 in FIG. 9), and then the tool calibration position may be determined based on measurements from the tracking device 210.

FIG. 10 illustrates a flowchart of a method 1000 for managing a robot system by a tracking device in accordance with embodiments of the present disclosure. At a block 1010, a first position of the tracking device 210 in relative to a tool marker 910 is obtained based on an image of the tool marker 910 that is collected by the vison sensor 212. Here, the tool marker 910 is attached to a tool 140 that is deployed in the robot system 130. Here, detailed steps for obtaining the first position of the tracking device 210 are similar as those steps that are described with reference to FIG. 4. Specifically, a real size and a virtual size may be obtained for the tool marker 910, and thus the first position of the tracking device 210 may be determined based on the real size, the virtual size and a focus parameter of the vision sensor 212 in the tracking device 210. Here, the first position of the tracking device 210 in relative to the tool marker 910 may be indicated by $$T_{ToolMarker}^{P1}.$$

At a block 1020, a second position of the tracking device in relative to the first position is obtained by the inertial sensor 214 after a movement of the tracking device 210. Here, the tracking device is coupled to the tool during the movement. In other words, the tracking device 210 is moved from the point 1 to the point 2 in FIG. 9, and the second position may be directly measured by the inertial sensor 214. Here, the second position of the tracking device 210 in relative to the first position may be indicated by $$T_{P1}^{Device}.$$

At a block 1030, a tool calibrating position is determined based on the first and second positions, the tool calibrating position representing a position of the tracking device 210 in relative to the tool marker 910 for calibrating the tool 140. In some embodiments, a position of the tool marker 910 in relative to a tool base of the robot system 130 may be obtained for the tool calibration. In the robot system 130, a relationship between the tool marker 910 and the tool base (indicated by $$T_{ToolBase}^{ToolMarker})$$

may be predefined by physical features of the tool marker 910, and thus $$T_{ToolBase}^{ToolMarker}$$

has a known value in the tool calibration. Further, the tool calibrating position may be based on the position of the tool marker and the first and second positions. In some embodiments, the following Formula 1 may be used for determining the tool calibrating position.

$$T_{ToolBase}^{Device} = T_{ToolBase}^{ToolMarker} \cdot T_{ToolMarker}^{P1} \cdot T_{P1}^{Device} \qquad \text{Formula 1}$$

Where $$T_{ToolBase}^{Device}$$

indicates the tool calibrating position for calibrating the tool 910 that is deployed at an end arm of the robot system 130, $$T_{ToolBase}^{ToolMarker}$$

indicates a relationship between the tool marker 910 and the tool base, $$T_{ToolMarker}^{P1}$$

indicates the first position of the tracking device 210 in relative to a tool marker 910, and $$T_{P1}^{Device}$$

indicates the second position of the tracking device 210 in relative to the first position. In the above Formula 1, $$T_{ToolBase}^{ToolMarker}$$

is a known parameter in the robot system 130, $$T_{ToolMarker}^{P1}$$

is measured by the vision sensor 212, and $$T_{P1}^{Device}$$

is measured by the inertial sensor 214, and thus the tool calibrating position $$T_{ToolBase}^{Device}$$

may be determined effectively and accurately.

Compared with a regular method for calibrating the tool 140 by placing the tool 140 to multiple poses during a complex calibrating procedure, the proposed solution only needs to attach the tool marker 910 to the tool 140 and collect measurements from the tracking device 210. Then, the tool calibrating position may be automatically determined from the measurements from the vision sensor 212 and the inertial sensor 214. Accordingly, the workload for calibrating the tool 140 may be greatly reduced.

In some embodiments, the work object 110 may be calibrated by attaching a robot marker to the tool 140 and attaching a work object marker to the work object 110 that is to be processed by the robot system 130. The tracking device 210 may scan the tool marker and work object marker respectively so as to obtain an object calibrating position for the work object calibration based on measurements of the tracking device 210. Here, object calibrating position represents a position of the work object marker in relative to a frame base of the robot system (the frame base is also called as "base0" and it is a known parameter of the robot system), and thus it may be used for calibrating the work object 110. Compared with a regular method for calibrating the work object by placing arms of the robot system in multiple poses around the work object with a calibrating tool, the proposed solution only needs to attach the robot marker to the tool and attach the work object marker to the work object. Then, the object calibrating position may be automatically determined. Accordingly, the complexity level for calibrating the work object may be greatly reduced.

Figure 11:
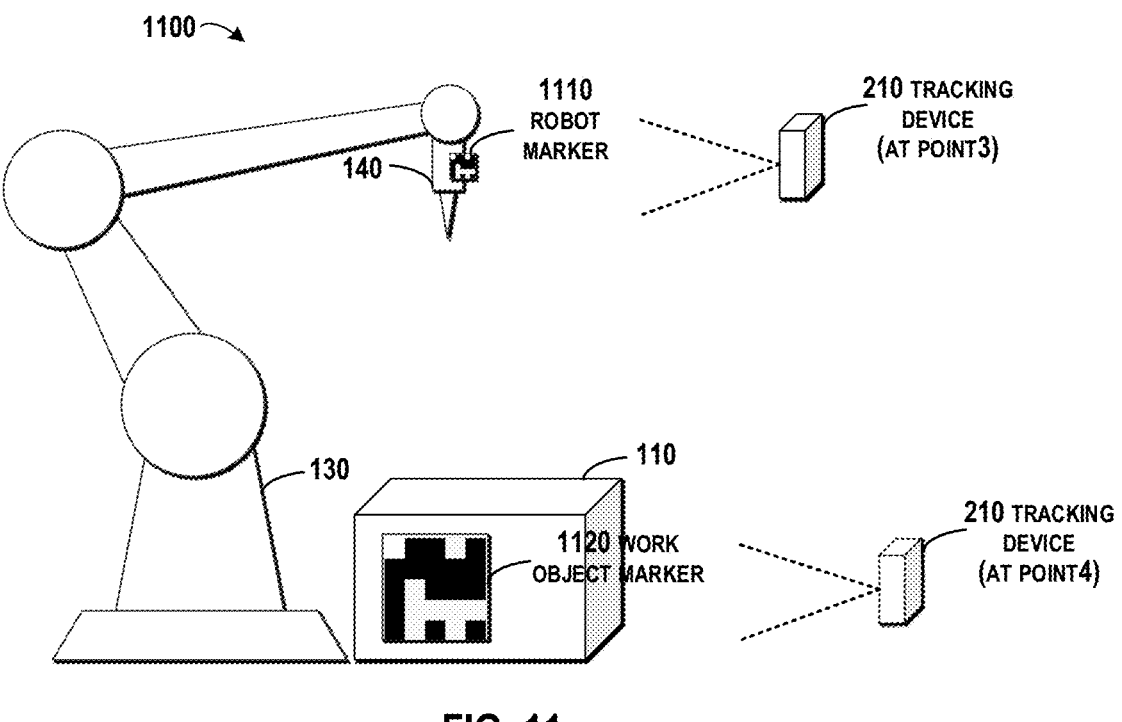
FIG. 11 illustrates a schematic diagram of a procedure for calibrating a work object that is to be processed by a robot system in accordance with embodiments of the present disclosure.

Hereinafter, reference will be made to FIG. 11 for more details of the work object calibration. FIG. 11 illustrates a schematic diagram of a procedure 1100 for calibrating a work object that is to be processed by a robot system in accordance with embodiments of the present disclosure. In FIG. 11, the tracking device 210 may be placed at point 3 for scanning a robot marker 1110 on the tool 140. At this point, a third position of the tracking device 210 in relative to the robot marker 1110 may be determined based on an image of the robot marker 1110 that is collected by the vison sensor 212. Here, detailed steps for obtaining the third position of the tracking device 210 are similar as those steps that are described with reference to FIG. 4. Specifically, a real size and a virtual size may be obtained for the robot marker 1110, and thus the third position of the tracking device 210 may be determined based on the real size, the virtual size and the focus parameter of the vision sensor 212. Here, the third position of the tracking device 210 in relative to the robot marker 1110 may be indicated by $$T_{RobotMarker}^{P3} \cdot$$

Next, the engineer may move the tracking device 210 to point 4 in FIG. 11, for scanning the work object marker 1120 on the work object 110. At this point, a fourth position of the tracking device 210 in relative to the work object marker 1120 may be determined based on an image of the work object marker 1120 that is collected by the vison sensor 212 after a movement of the tracking device. Here, the tracking device is moved to point 4 for collecting the image of the work object marker 1120. Specifically, a real size and a virtual size may be obtained for the work object marker 1120, and thus the fourth position of the tracking device 210 may be determined based on the real size, the virtual size and the focus parameter of the vision sensor 212. Here, the fourth position of the tracking device 210 in relative to the work object marker 1120 may be indicated by $$T_{WorkObjMarker}^{P4}.$$

During moving the tracking device 210 from point 3 to point 4, a fifth position of the tracking device 210 in relative to the third position may be determined by the inertial sensor 214 after a movement of the tracking device 210. Here, the fifth position may be directly measured by the inertial sensor 214. Then, the object calibrating position may be based on a position of the robot marker 1110, and the third, fourth, and fifth positions. In some embodiments, the following Formula 2 may be used for determining the object calibrating position.

$$T_{FrameBase}^{WorkObjMarker} = T_{FrameBase}^{RobotMarker} \cdot T_{RobotMarker}^{P3} \cdot T_{P3}^{P4} \cdot \left(T_{WorkObjMarker}^{P4}\right)^{-1} \quad \text{Formula 2}$$

Where $$T_{FrameBase}^{WorkObjMarker}$$

indicates the object calibrating position for calibrating the work object 110 that is to be processed by the robot system 130, $$T_{FrameBase}^{RobotMarker}$$

indicates a position as of the robot marker 1110 that may be read from the robot system 130, $$T_{RobotMarker}^{P3}$$

indicates third position of the tracking device 210 in relative to the robot marker 1110, $$T_{WorkObjMarker}^{P4}$$

indicates the fourth position of the tracking device 210 in relative to the work object marker 1120, and $$T_{P3}^{P4}$$

indicates fifth position of the tracking device 210 in relative to the third position. In the above Formula 2, $$T_{FrameBase}^{RobotMarker}$$

may be directly read from the robot system 130, meanwhile, $$T_{RobotMarker}^{P3}, T_{P3}^{P4}, \text{ and } T_{WorkObjMarker}^{P4}$$

may be measured by the vision sensor 212 and the inertial sensor 214. Accordingly, the object calibrating position may be determined effectively and accurately. With these embodiments, the tracking device 210 may collect measurements for the object calibration, and thus the object calibrating position may be automatically determined according to the collected measurements.

It is to be understood that the tool calibration and the work object calibration may be implemented independently. Although the above paragraphs describe the tool calibration before the work object calibration, the tool calibration may be implemented after the work object calibration or at the same time point for the work object calibration.

In some embodiments, any of the tool marker 910, the work object marker 1120, and the robot marker 1110 includes a QR code. With these embodiments, the QR code may be used as any of these markers. Compared with a regular calibrating tool with a large size and a high precision, the QR code is easy to be generated with a smaller size and a high precision. Therefore, the QR code may facilitate the calibration in an easy and effective way.

In some embodiments, a tool path may be obtained for processing the work object 110. Here, the tool path may be obtained by the regular ways (for example, by using the tracking tool 122 and the sensor 120 as illustrated in FIG. 1B). Alternatively and/or in addition to, the tool path may be obtained by the tracking device 210. Specifically, when the tracking device 210 may be attached to the tool 140 for determining the tool path in relative to the work object marker 1120 that is attached to the work object 110. The engineer may hold the tool 140 on which the tracking device 210 is attached, and move the tool 140 along a trajectory for processing the work object 110 by the robot system 130. At this point, a plurality of positions of the tracking device 210 may be obtained in relative to the work object marker 1120. Then, the tool path 720 may be generated based on the plurality of positions of the tracking device 210. With these embodiments, the tracking device may be attached to a tool for processing a work object, and thus the engineer only needs to lead the tool along the trajectory and generate the tool path. Compared with a regular way for generating the tool path by a pair of a tracking tool and a signal source, the tracking device itself may record the tool path accurately.

In some embodiments, the detailed steps for determining a position in the plurality of positions are similar as steps that are implemented by the method 300. Initially, the tracking device 210 may scan the work object marker 1120 for obtaining a sixth position of the tracking device 210 in relative to the work object marker 1120. At this point, the sixth position may be determined from the image of the work object marker 1120 according to the procedure as shown in FIG. 4. Further, the inertial sensor 214 may directly measure a seventh position of the tracking device 210 in relative to the sixth position during the movement of the tool 140. Then, each of the plurality of positions of the tracking device may be determined based on the sixth and seventh positions. With these embodiments, a tracking device that includes both of a vision sensor and an inertial sensor is provided for position determination. At this point, the tracking device may determine the position by itself without a requirement of outside signal sources. Further, errors in determined positions caused by a block of the signal source or interference to the signal source may be eliminated. Therefore, the position determination may be implemented in a more convenient and effective way.

It is to be understood that the robot path can control movements of the end arm, and the tool 140 deployed at the end arm may move together with the end arm. Therefore, the tool calibrating position may be considered in generating the robot path. Further, as the object calibrating position represents a relationship between the work object marker 1120 and the frame base of the robot system 130, the object calibrating position is also considered in generating the robot path. Accordingly, the robot path may be generated for processing the work object based on the tool calibrating position, the object calibrating position, and the tool path.

Figure 12:
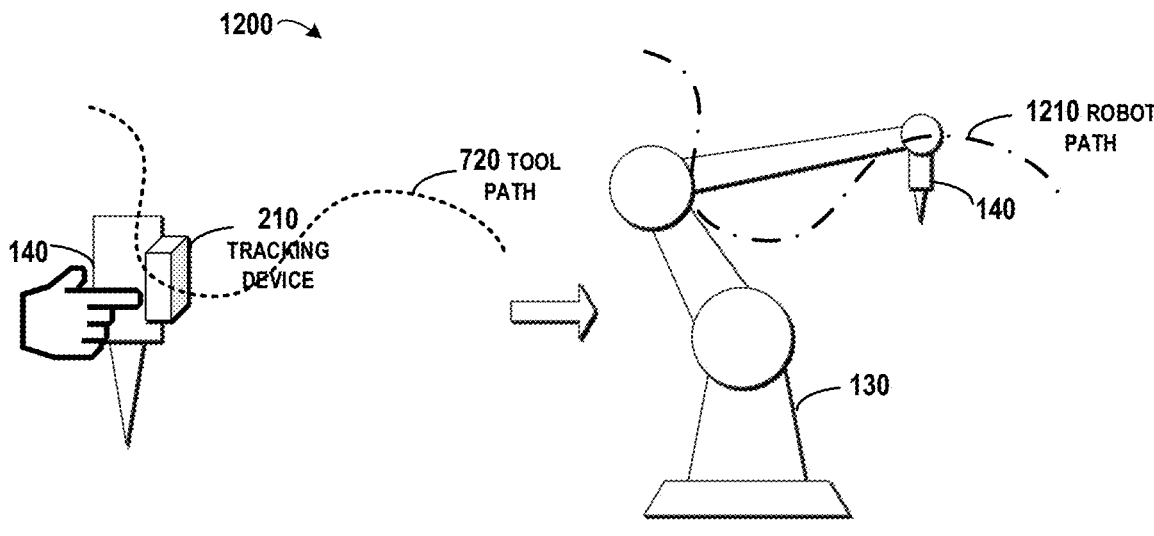
FIG. 12 illustrates a schematic diagram of a procedure for obtaining a robot path for controlling a robot system in accordance with embodiments of the present disclosure.

FIG. 12 illustrates a schematic diagram of a procedure 1200 for obtaining a robot path for controlling a robot system in accordance with embodiments of the present disclosure. As shown in FIG. 12, the tool path 720 may be converted into the robot path 1210 based on the tool calibrating position and the object calibrating position. Specially, the following Formula 3 may be used.

$$RobotPath_{FrameBase}^{ToolBase} = T_{FrameBase}^{WorkObjMarker} \cdot \left(T_{ToolBase}^{Device}\right)^{-1} \cdot ToolPath_{WorkObjMarker}^{Device}$$

Where $$RobotPath_{FrameBase}^{ToolBase}$$

indicates the robot path for controlling the robot system 130, $$T_{FrameBase}^{WorkObjMarker}$$

indicates the object calibrating position for calibrating the work object 110 that is to be processed by the robot system 130, $$T_{ToolBase}^{Device}$$

indicates the tool calibrating position for calibrating the tool 910 that is deployed at an end arm of the robot system 130, and $$ToolPath_{WorkObjMarker}^{Device}$$

indicates the tool path 720 determined by the tracking device 210. As all parameters on the right side of Formula 3 are known, the tool path 720 may be automatically converted into the robot path 1210 for controlling a movement of the tool 140 in the robot system 130.

In some embodiments, the method further comprises: controlling the robot system 130 to process the work object 110 based on the robot path 1210. At this point, tool 140 at the end arm of the robot system 130 may process the work object 110 into a desired shape. With these embodiments, the robot system 130 may drive the tool 130 to exactly follow the trajectory, such that the work object may be processed accurately as desired. Further, embodiments of the present invention may lower costs for the robot system deployment as well as the technical requirements for the engineer. By using the tracking device 210, the engineer may attach markers to the tool 140 and the work object 110, and collect measurements by the tracking device 210. Then, both of the tool 140 and the work object 110 may be automatically calibrated based on the collected measurements before the tool 140 starts to process the work object 110.

The preceding paragraphs having described detailed steps of the methods 300 and 1000, in some embodiments of the present disclosure, the methods 300 and 1000 may be implemented by corresponding apparatuses. FIG. 13A illustrates a schematic diagram of a position determining apparatus 1300A for determining a position of a tracking device in accordance with embodiments of the present disclosure. As illustrated in FIG. 13A, the apparatus 1300A is for determining a position of a tracking device, the tracking device includes a vision sensor and an inertial sensor. The apparatus 1300A comprises: a first obtaining unit 1310A for obtaining a first position of the tracking device in relative to a reference marker based on an image of the reference marker that is collected by the vison sensor; a second obtaining unit 1320A for obtaining by the inertial sensor a second position of the tracking device in relative to the first position after a movement of the tracking device; and a determining unit 1330A for determining a position of the tracking device in relative to the reference marker based on the first and second positions.

In some embodiments, the first obtaining unit 1310A comprises: a real size obtaining unit for obtaining a real size of the reference marker; a virtual size obtaining unit for obtaining a virtual size of the reference marker in the image; and a position determining unit for determining the first position based on the real size, the virtual size and a focus parameter of the vision sensor.

In some embodiments, the apparatus 1300A further comprises: a collecting unit for collecting by the vision sensor an environment image of an working environment of the tracking device after the movement; and a correcting unit for correcting the second position based on the environment image and a previous environment image that is collected by the vision sensor at a previous time point before a time point for collecting the environment image.

In some embodiments, the correcting unit comprises: an identifying unit for identifying a pair of feature points from the environment image and the previous environment image based on an image analysis, respectively, the pair of feature points corresponding to an environment feature in the working environment; and an offset determining unit for determining an offset between positions of the pair of feature points; and a position correcting unit for correcting the second position based on the offset.

In some embodiments, the tracking device is attached to one of a tool that is deployed in a robot system and a work object that is to be processed by the robot system, and the reference marker is attached to the other of the tool and the work object.

In some embodiments, the apparatus 1300A further comprises: a path determining unit for determining a group of positions of the tracking device during a movement of the tool along a trajectory for processing the work object.

In some embodiments, the tracking device includes a phone device, the vision sensor includes a camera equipped in the phone device, and the inertial sensor includes an inertial measurement unit equipped in the phone device.

In some embodiments, the apparatus 1300A is implemented by an application that is installed in the phone device, and the apparatus further comprises: an adjusting unit for adjusting a processing parameter of the robot system via a user input to the application.

In some embodiments, the reference marker includes a Quick Response (QR) code.

FIG. 13B illustrates a schematic diagram of a robot managing apparatus 1300B for managing a robot system in accordance with embodiments of the present disclosure, the tracking device includes a vision sensor and an inertial sensor. The apparatus 1300B comprises: a first obtaining unit 1310B for obtaining a first position of the tracking device in relative to a tool marker based on an image of the tool marker that is collected by the vison sensor, the tool marker being attached to a tool that is deployed in the robot system; a second obtaining unit 1320B for obtaining by the inertial sensor a second position of the tracking device in relative to the first position after a movement of the tracking device, the tracking device being coupled to the tool during the movement; and a determining unit 1330B for determining a tool calibrating position based on the first and second positions, the tool calibrating position representing a position of the tracking device in relative to the tool marker for calibrating the tool.

In some embodiments, the determining unit 1330B comprises: a tool position obtaining unit for obtaining a position of the tool marker in relative to a tool base of the robot system; and a tool calibration determining unit for determining the tool calibrating position based on the position of the tool marker and the first and second positions.

In some embodiments, the apparatus 1300B further comprises: an object obtaining unit for obtaining an object calibrating position based on a robot marker and a work object marker, the robot marker being attached to the tool, the work object marker being attached to a work object that is to be processed by the robot system, and the object calibrating position representing a position of the work object marker in relative to a frame base of the robot system for calibrating the work object.

In some embodiments, the object obtaining unit comprises: a third obtaining unit for obtaining a third position of the tracking device in relative to the robot marker based on an image of the robot marker that is collected by the vison sensor; a fourth obtaining unit for obtaining a fourth position of the tracking device in relative to the work object marker based on an image of the work object marker that is collected by the vison sensor after a movement of the tracking device, the tracking device being moved for collecting the image of the work object marker; a fifth obtaining unit for obtaining by the inertial sensor a fifth position of the tracking device in relative to the third position during the movement; and an object calibration determining unit for determining the object calibrating position based on a position of the robot marker, and the third, fourth, and fifth positions.

In some embodiments, the apparatus 1300B further comprises: a position obtaining unit for obtaining a plurality of positions of the tracking device in relative to the work object marker, the tracking device being coupled to the tool, and the plurality of positions being determined during a movement of the tool along a trajectory for processing the work object by the robot system; and a generating unit for generating a tool path based on the plurality of positions of the tracking device.

In some embodiments, the position obtaining unit comprises: a sixth obtaining unit for obtaining a sixth position of the tracking device in relative to the work object marker based on an image of the work object marker that is collected by the vison sensor; a seventh obtaining unit for obtaining by the inertial sensor a seventh position of the tracking device in relative to the sixth position during the movement of the tool; and a path position determining unit for determining a position in the plurality of positions of the tracking device in relative to the work object marker based on the sixth and seventh positions.

In some embodiments, the apparatus 1300B further comprises: a generating unit for generating a robot path for processing the work object based on the tool calibrating position, the object calibrating position, and the tool path.

In some embodiments, the apparatus 1300B further comprises: a controlling unit for controlling the robot system to process the work object based on the robot path.

In some embodiments, any of the tool marker, the work object marker, and the robot marker includes a Quick Response (QR) code.

In some embodiments of the present disclosure, a system is provided for implementing the above methods 300 and 1000. FIG. 14 illustrates a schematic diagram of a system 1400 for implementing a method in accordance with embodiments of the present disclosure. The system 1400 comprises: a computer processor 1410 coupled to a computer-readable memory unit 1420, the memory unit 1420 comprising instructions 1422 that when executed by the computer processor 1410 implements the methods 300 or 1000.

In some embodiments of the present disclosure, a computer readable medium for managing a camera system is provided. The computer readable medium has instructions stored thereon, and the instructions, when executed on at least one processor, may cause at least one processor to perform the method for managing a camera system as described in the preceding paragraphs, and details will be omitted hereinafter.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 3 and 10. Generally, program modules include routines, programs, libraries, objects, classes, components, data structures, or the like that perform particular tasks or implement particular abstract data types. The functionality of the program modules may be combined or split between program modules as ideal in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for determining a position of a tracking device, the tracking device includes a vision sensor and an inertial sensor, and the method comprising:

obtaining a first position of the tracking device relative to a reference marker based on an image of the reference marker that is collected by the vision sensor;

obtaining by the inertial sensor a second position of the tracking device relative to the first position after a movement of the tracking device; and determining a position of the tracking device relative to the reference marker based on the first and second positions;

obtaining an object calibrating position based on a robot marker and a work object marker, the robot marker being attached to a tool that is deployed in a robot system, the work object marker being attached to a work object that is to be processed by the robot system, and the object calibrating position representing a position of the work object marker relative to a frame base of the robot system for calibrating the work object;

obtaining a plurality of positions of the tracking device relative to the work object marker, the tracking device being coupled to the tool, and the plurality of positions being determined during a movement of the tool along a trajectory for processing the work object by the robot system; and generating a tool path based on the plurality of positions of the tracking device.

2. The method of claim 1, wherein obtaining the first position comprises:

obtaining a real size of the reference marker;

obtaining a virtual size of the reference marker in the image; and determining the first position based on the real size, the virtual size and a focus parameter of the vision sensor.

3. The method of claim 1, further comprising:

collecting by the vision sensor an environment image of a working environment of the tracking device after the movement; and correcting the second position based on the environment image and a previous environment image that is collected by the vision sensor at a previous time point before a time point for collecting the environment image.

4. The method of claim 3, wherein correcting the second position comprises:

identifying a pair of feature points from the environment image and the previous environment image based on an image analysis, respectively, the pair of feature points corresponding to an environment feature in the working environment; and determining an offset between positions of the pair of feature points; and correcting the second position based on the offset.

5. The method of claim 1, wherein the tracking device is attached to one of the tool that is deployed in the robot system and the work object that is to be processed by the robot system, and the reference marker is attached to the other of the tool and the work object.

6. The method of claim 5, further comprising: determining a group of positions of the tracking device during the movement of the tool along the trajectory for processing the work object.

7. The method of claim 6, wherein the tracking device includes a phone device, the vision sensor includes a camera equipped in the phone device, and the inertial sensor includes an inertial measurement unit equipped in the phone device.

8. The method of claim 7, wherein the method is implemented by an application that is installed in the phone device, and the method further comprises: adjusting a processing parameter of the robot system via a user input to the application.

9. The method of claim 1, wherein the reference marker includes a Quick Response (QR) code.

10. A method for managing a robot system by a tracking device, the tracking device includes a vision sensor and an inertial sensor, and the method comprising:

obtaining a first position of the tracking device relative to a tool marker based on an image of the tool marker that is collected by the vision sensor, the tool marker being attached to a tool that is deployed in the robot system;

obtaining by the inertial sensor a second position of the tracking device relative to the first position after a movement of the tracking device, the tracking device being coupled to the tool during the movement;

determining a tool calibrating position based on the first and second positions, the tool calibrating position representing a position of the tracking device relative to the tool marker for calibrating the tool;

obtaining an object calibrating position based on a robot marker and a work object marker, the robot marker being attached to the tool, the work object marker being attached to a work object that is to be processed by the robot system, and the object calibrating position representing a position of the work object marker relative to a frame base of the robot system for calibrating the work object;

obtaining a plurality of positions of the tracking device relative to the work object marker, the tracking device being coupled to the tool, and the plurality of positions being determined during a movement of the tool along a trajectory for processing the work object by the robot system; and generating a tool path based on the plurality of positions of the tracking device.

11. The method of claim 10, wherein determining the tool calibrating position comprises:

obtaining a position of the tool marker relative to a tool base of the robot system; and determining the tool calibrating position based on the position of the tool marker and the first and second positions.

12. The method of claim 10, wherein obtaining the object calibrating position comprises:

obtaining a third position of the tracking device relative to the robot marker based on an image of the robot marker that is collected by the vision sensor;

obtaining a fourth position of the tracking device relative to the work object marker based on an image of the work object marker that is collected by the vision sensor after a movement of the tracking device, the tracking device being moved for collecting the image of the work object marker;

obtaining by the inertial sensor a fifth position of the tracking device relative to the third position during the movement; and determining the object calibrating position based on a position of the robot marker, and the third, fourth, and fifth positions.

13. The method of claim 10, wherein obtaining the plurality of positions comprises:

obtaining a sixth position of the tracking device relative to the work object marker based on an image of the work object marker that is collected by the vision sensor;

obtaining by the inertial sensor a seventh position of the tracking device relative to the sixth position during the movement of the tool; and determining a position in the plurality of positions of the tracking device relative to the work object marker based on the sixth and seventh positions.

14. The method of claim 10, further comprising: generating a robot path for processing the work object based on the tool calibrating position, the object calibrating position, and the tool path.

15. The method of claim 14, further comprising: controlling the robot system to process the work object based on the robot path.

16. The method of claim 10, wherein any of the tool marker, the work object marker, and the robot marker includes a Quick Response (QR) code.

17. An apparatus for determining a position of a tracking device, the tracking device includes a vision sensor and an inertial sensor, and the apparatus comprising:

a first obtaining unit for obtaining a first position of the tracking device relative to a reference marker based on an image of the reference marker that is collected by the vision sensor;

a second obtaining unit for obtaining by the inertial sensor a second position of the tracking device relative to the first position after a movement of the tracking device;

a determining unit for determining the position of the tracking device relative to the reference marker based on the first and second positions; and an object obtaining unit for obtaining an object calibrating position based on a robot marker and a work object marker, the robot marker being attached to a tool that is deployed in a robot system, the work object marker being attached to a work object that is to be processed by the robot system, and the object calibrating position representing a position of the work object marker relative to a frame base of the robot system for calibrating the work object, wherein the object obtaining unit comprises:

a third obtaining unit for obtaining a third position of the tracking device relative to the robot marker based on an image of the robot marker that is collected by the vision sensor;

a fourth obtaining unit for obtaining a fourth position of the tracking device relative to the work object marker based on an image of the work object marker that is collected by the vision sensor after a movement of the tracking device, the tracking device being moved for collecting the image of the work object marker;

a fifth obtaining unit for obtaining by the inertial sensor a fifth position of the tracking device relative to the third position during the movement; and an object calibration determining unit for determining the object calibrating position based on a position of the robot marker, and the third, fourth, and fifth positions.

18. The apparatus of claim 17, wherein the first obtaining unit comprises:

a real size obtaining unit for obtaining a real size of the reference marker;

a virtual size obtaining unit for obtaining a virtual size of the reference marker in the image; and a position determining unit for determining the first position based on the real size, the virtual size and a focus parameter of the vision sensor.

19. The apparatus of claim 17, further comprising:

a collecting unit for collecting by the vision sensor an environment image of a working environment of the tracking device after the movement; and a correcting unit for correcting the second position based on the environment image and a previous environment image that is collected by the vision sensor at a previous time point before a time point for collecting the environment image.

20. The apparatus of claim 19, wherein the correcting unit comprises:

an identifying unit for identifying a pair of feature points from the environment image and the previous environment image based on an image analysis, respectively, the pair of feature points corresponding to an environment feature in the working environment; and an offset determining unit for determining an offset between positions of the pair of feature points; and a position correcting unit for correcting the second position based on the offset.

21. The apparatus of claim 17, wherein the tracking device is attached to one of the tool that is deployed in a robot system and a work object that is to be processed by the robot system, and the reference marker is attached to the other of the tool and the work object.

22. The apparatus of claim 21, further comprising: a path determining unit for determining a group of positions of the tracking device during a movement of the tool along a trajectory for processing the work object.

23. The apparatus of claim 22, wherein the tracking device includes a phone device, the vision sensor includes a camera equipped in the phone device, and the inertial sensor includes an inertial measurement unit equipped in the phone device.

24. The apparatus of claim 23, wherein the apparatus is implemented by an application that is installed in the phone device, and the apparatus further comprises: an adjusting unit for adjusting a processing parameter of the robot system via a user input to the application.

25. The apparatus of claim 17, wherein the reference marker includes a Quick Response (QR) code.

26. An apparatus for managing a robot system by a tracking device, the tracking device includes a vision sensor and an inertial sensor, and the apparatus comprising:

a first obtaining unit for obtaining a first position of the tracking device relative to a tool marker based on an image of the tool marker that is collected by the vision sensor, the tool marker being attached to a tool that is deployed in the robot system;

a second obtaining unit for obtaining by the inertial sensor a second position of the tracking device relative to the first position after a movement of the tracking device, the tracking device being coupled to the tool during the movement; and a determining unit for determining a tool calibrating position based on the first and second positions, the tool calibrating position representing a position of the tracking device relative to the tool marker for calibrating the tool;

an object obtaining unit for obtaining an object calibrating position based on a robot marker and a work object marker, the robot marker being attached to the tool, the work object marker being attached to a work object that is to be processed by the robot system, and the object calibrating position representing a position of the work object marker relative to a frame base of the robot system for calibrating the work object, wherein the object obtaining unit comprises:

a third obtaining unit for obtaining a third position of the tracking device relative to the robot marker based on an image of the robot marker that is collected by the vision sensor;

a fourth obtaining unit for obtaining a fourth position of the tracking device relative to the work object marker based on an image of the work object marker that is collected by the vision sensor after a movement of the tracking device, the tracking device being moved for collecting the image of the work object marker;

a fifth obtaining unit for obtaining by the inertial sensor a fifth position of the tracking device relative to the third position during the movement; and an object calibration determining unit for determining the object calibrating position based on a position of the robot marker, and the third, fourth, and fifth positions.

27. The apparatus of claim 26, wherein the determining unit comprises:

a tool position obtaining unit for obtaining a position of the tool marker relative to a tool base of the robot system; and a tool calibration determining unit for determining the tool calibrating position based on the position of the tool marker and the first and second positions.

28. The apparatus of claim 26, further comprising:

a position obtaining unit for obtaining a plurality of positions of the tracking device relative to the work object marker, the tracking device being coupled to the tool, and the plurality of positions being determined during a movement of the tool along a trajectory for processing the work object by the robot system; and a generating unit for generating a tool path based on the plurality of positions of the tracking device.

29. The apparatus of claim 28, wherein the position obtaining unit comprises:

a sixth obtaining unit for obtaining a sixth position of the tracking device relative to the work object marker based on an image of the work object marker that is collected by the vision sensor;

a seventh obtaining unit for obtaining by the inertial sensor a seventh position of the tracking device relative to the sixth position during the movement of the tool; and a path position determining unit for determining a position in the plurality of positions of the tracking device relative to the work object marker based on the sixth and seventh positions.

30. The apparatus of claim 28, further comprising: a generating unit for generating a robot path for processing the work object based on the tool calibrating position, the object calibrating position, and the tool path.

31. The apparatus of claim 30, further comprising: a controlling unit for controlling the robot system to process the work object based on the robot path.

32. The apparatus of claim 28, wherein any of the tool marker, the work object marker, and the robot marker includes a Quick Response code.

33. A system for determining a position of a tracking device, comprising:

a computer processor coupled to a computer-readable memory unit, the memory unit comprising instructions that when executed by the computer processor implements the method according to claim 1.

34. A computer readable medium having instructions stored thereon, the instructions, when executed on at least one processor, cause the at least one processor to perform the method according to claim 1.

35. A system for managing a robot system, comprising:

a computer processor coupled to a computer-readable memory unit, the memory unit comprising instructions that when executed by the computer processor implements the method according to claim 10.

36. A computer readable medium having instructions stored thereon, the instructions, when executed on at least one processor, cause the at least one processor to perform the method according to claim 10.

\* \* \* \* \*